US010325378B2

(12) United States Patent
Koizumi

(10) Patent No.: US 10,325,378 B2
(45) Date of Patent: Jun. 18, 2019

(54) IMAGE PROCESSING APPARATUS, IMAGE PROCESSING METHOD, AND NON-TRANSITORY STORAGE MEDIUM

(71) Applicant: CANON KABUSHIKI KAISHA, Tokyo (JP)

(72) Inventor: Tatsuro Koizumi, Niiza (JP)

(73) Assignee: Canon Kabushiki Kaisha, Tokyo (JP)

( * ) Notice: Subject to any disclaimer, the term of this patent is extended or adjusted under 35 U.S.C. 154(b) by 77 days.

(21) Appl. No.: 15/717,799

(22) Filed: Sep. 27, 2017

(65) Prior Publication Data

US 2018/0089849 A1 Mar. 29, 2018

(30) Foreign Application Priority Data

Sep. 29, 2016 (JP) ................................. 2016-190475

(51) Int. Cl.
*G06K 9/00* (2006.01)
*G06T 7/55* (2017.01)
*G06T 7/536* (2017.01)
*G06T 7/194* (2017.01)
*G06T 7/11* (2017.01)

(52) U.S. Cl.
CPC .................. *G06T 7/55* (2017.01); *G06T 7/11* (2017.01); *G06T 7/194* (2017.01); *G06T 7/536* (2017.01); *G06T 2207/10028* (2013.01)

(58) Field of Classification Search
CPC ........... G06T 7/55; G06T 7/536; G06T 7/194; G06T 7/11; G06T 2207/10028
USPC ....................................................... 382/154
See application file for complete search history.

(56) References Cited

U.S. PATENT DOCUMENTS

| 8,830,236 B2* | 9/2014 | Germann | G06K 9/00201 345/419 |
| 9,117,113 B2* | 8/2015 | Popa | G06K 9/00342 |
| 2002/0060686 A1* | 5/2002 | Matsumoto | G06T 15/04 345/582 |

(Continued)

FOREIGN PATENT DOCUMENTS

JP 2001-307073 A 11/2001

OTHER PUBLICATIONS

Matusik et al., Image-Based Visual Hulls, Proceedings of SIGGRAPH, 2000.

*Primary Examiner* — Van D Huynh
(74) *Attorney, Agent, or Firm* — Canon U.S.A., Inc. IP Division

(57) ABSTRACT

An image processing apparatus includes: an acquisition unit configured to acquire pieces of silhouette image data of an object viewed from multiple different viewpoints; a generation unit configured to generate, from the pieces of silhouette image data, pieces of low-resolution data representing images with a resolution lower than the pieces of silhouette image data; and an estimation unit configured to, by performing, for a plurality of line segments in space containing the object, processing in which, after a line segment in the space is projected onto a piece of low-resolution data to calculate a first intersection of the line segment with the object, the line segment is projected onto a piece of silhouette image data to calculate a second intersection of the line segment with the object, calculate intervals over which the plurality of line segments intersect the object and estimate a shape of the object.

10 Claims, 11 Drawing Sheets

(56) References Cited

U.S. PATENT DOCUMENTS

| | | | | |
|---|---|---|---|---|
| 2003/0034971 A1* | 2/2003 | Fujiwara | ............... | G06T 17/30 |
| | | | | 345/420 |
| 2006/0227133 A1* | 10/2006 | Petrov | ............... | G06K 9/20 |
| | | | | 345/419 |
| 2009/0154794 A1* | 6/2009 | Kim | ............... | G06T 15/205 |
| | | | | 382/154 |
| 2010/0073378 A1* | 3/2010 | Abe | ............... | G06K 9/00033 |
| | | | | 345/441 |
| 2010/0141682 A1* | 6/2010 | Perz | ............... | G06K 9/0014 |
| | | | | 345/660 |

* cited by examiner

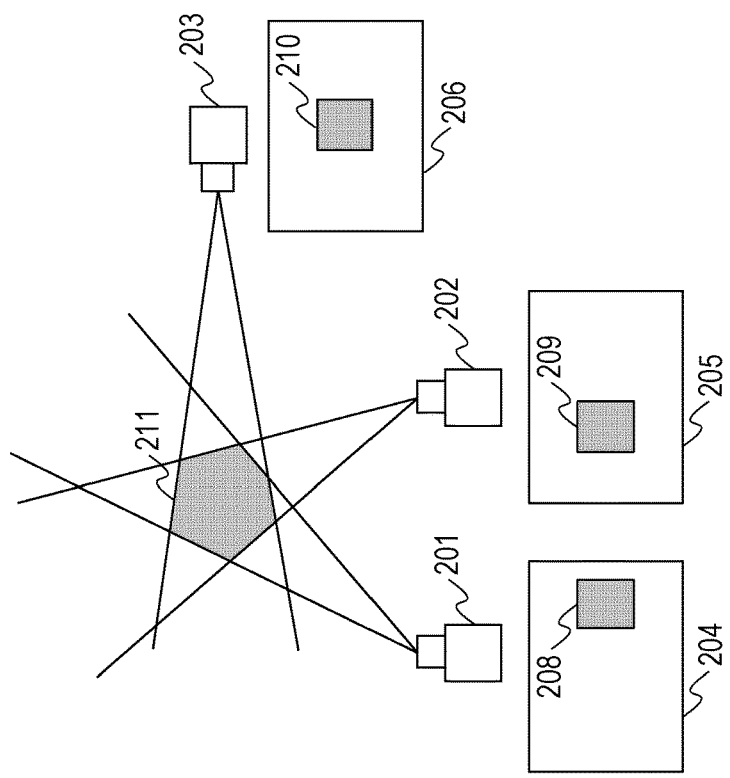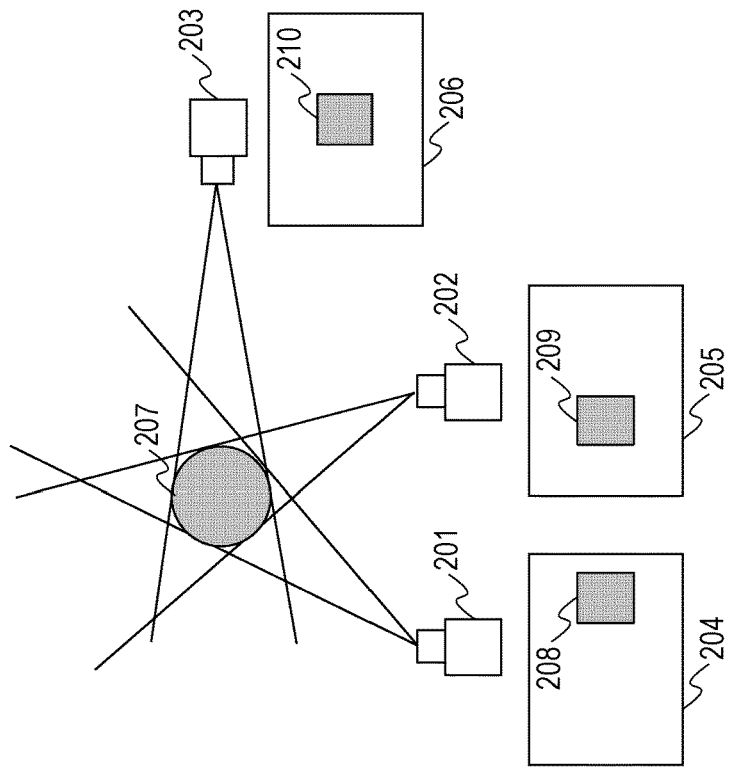

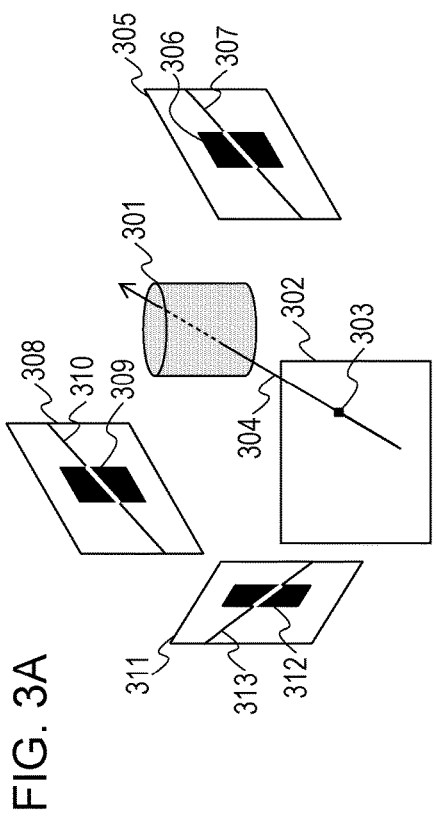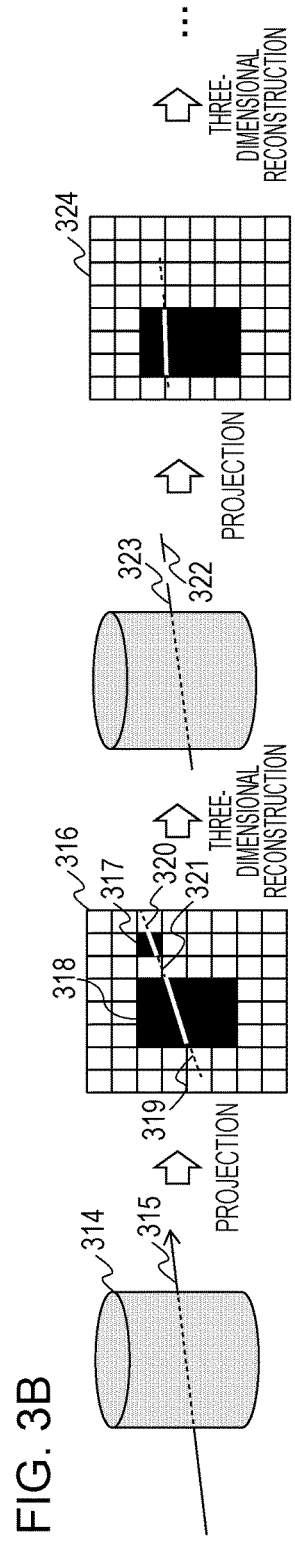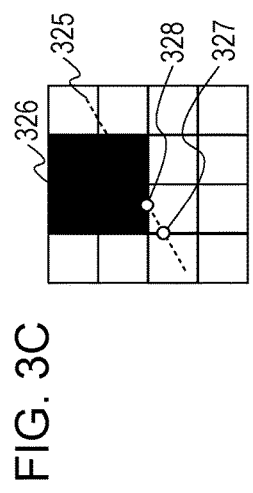
FIG. 3A
FIG. 3B
FIG. 3C

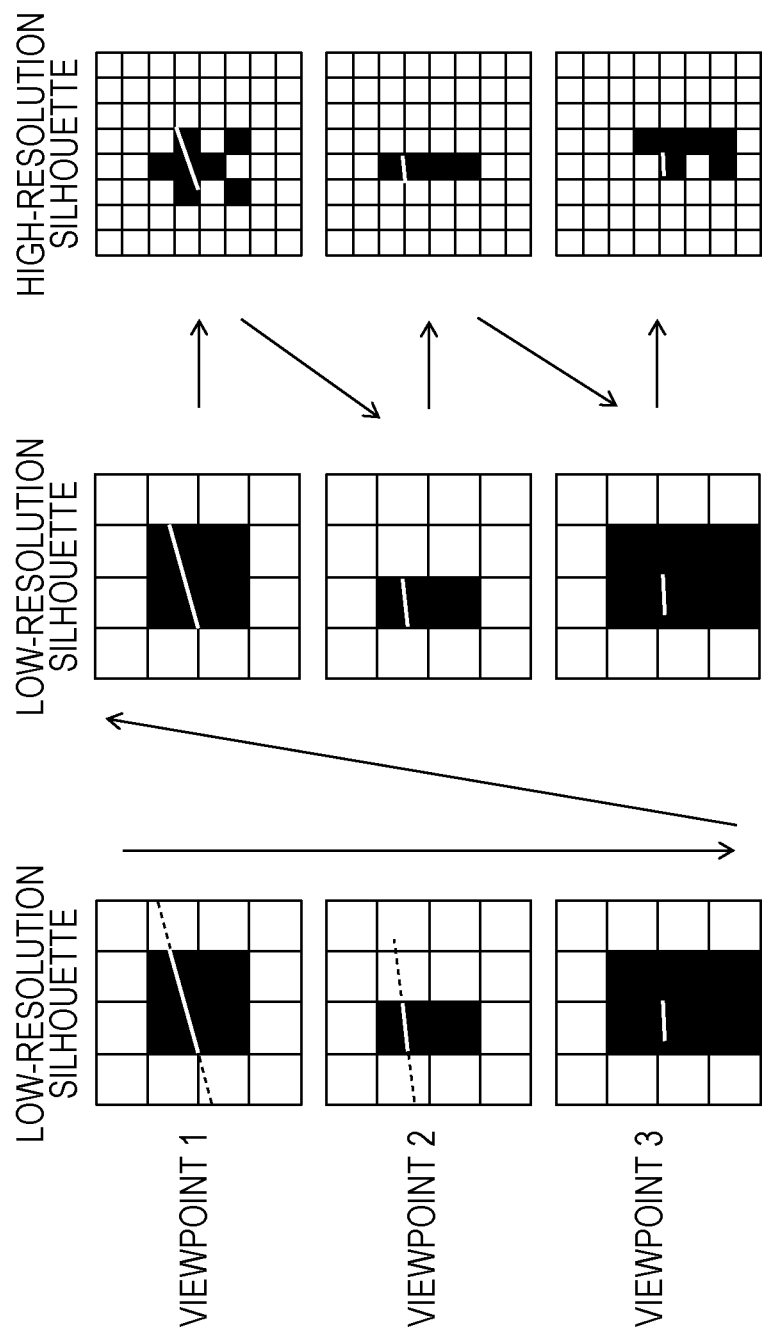

IMAGE PROCESSING APPARATUS, IMAGE PROCESSING METHOD, AND NON-TRANSITORY STORAGE MEDIUM

BACKGROUND OF THE INVENTION

Field of the Invention

The present invention relates to a technique for obtaining an estimated shape of an object from multi-viewpoint images.

Description of the Related Art

As a method for reconstructing a three-dimensional shape of an object by using images captured from multiple viewpoints by a plurality of cameras, there is a volume intersection method. In the volume intersection method, a portion common to regions obtained by projecting silhouettes of the object on the images captured from the multiple viewpoints into space is calculated as an object shape. As a method for reconstructing a shape fast on the basis of the volume intersection method, Japanese Patent Laid-Open No. 2001-307073 proposes a method in which space is divided into voxels and hierarchically refined. Furthermore, Wojciech Matusik et al., "Image-Based Visual Hulls". Proceedings of SIGGRAPH 2000 discloses a method in which an intersection of a ray with an object shape is calculated by using the contour of a silhouette of an object with the calculation being limited to necessary rays.

In the method proposed in Japanese Patent Laid-Open No. 2001-307073, however, a shape estimation is performed for the whole of space to be measured, thereby increasing the amount of calculation if the space to be measured is large. Furthermore, in the method disclosed in Wojciech Matusik et al., "Image-Based Visual Hulls", Proceedings of SIGGRAPH 2000, the contour of a silhouette is extracted, thereby increasing the amount of calculation if the resolution of an input image is high.

SUMMARY OF THE INVENTION

The disclosed embodiments provide for obtaining an estimated shape of an object with a small amount of calculation in comparison with the related arts. In some embodiments, an image processing apparatus includes: an acquisition unit configured to acquire pieces of silhouette image data of an object viewed from multiple different viewpoints; a generation unit configured to generate, from the pieces of silhouette image data, pieces of low-resolution data representing images with a resolution lower than the pieces of silhouette image data; and an estimation unit configured to, by performing, for a plurality of line segments in space containing the object, processing in which, after a line segment in the space is projected onto a piece of low-resolution data to calculate a first intersection of the line segment with the object, the line segment is projected onto a piece of silhouette image data to calculate a second intersection of the line segment with the object, calculate intervals over which the plurality of line segments intersect the object and estimate a shape of the object.

Further features of the present invention will become apparent from the following description of exemplary embodiments with reference to the attached drawings.

BRIEF DESCRIPTION OF THE DRAWINGS

FIGS. 2A and 2B illustrate the principle of a volume intersection method.

FIGS. 3A to 3C illustrate an overview of a shape estimation method according to the present disclosure.

FIGS. 10A to 10C illustrate a comparison of a first embodiment and a second embodiment.

DESCRIPTION OF THE EMBODIMENTS

First Embodiment

Overall Configuration of Image Capturing System

Figure 1:
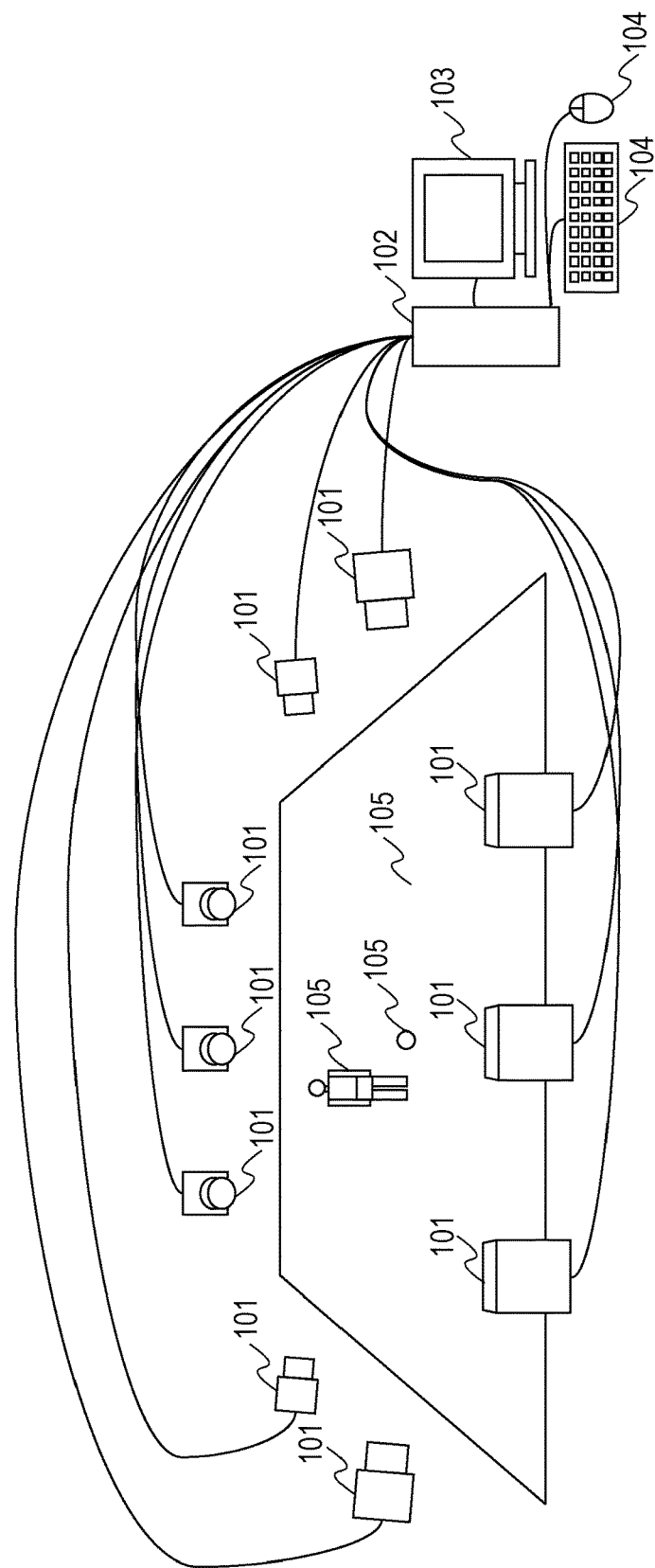
FIG. 1 is a schematic diagram illustrating an example of an image capturing system including an image processing apparatus according to the present disclosure.

FIG. 1 is a schematic diagram illustrating an example of an image capturing system including an image processing apparatus to which embodiments of the present invention can be applied. The image capturing system includes a plurality of image capturing apparatuses 101, an image processing apparatus 102, a display device 103, and input devices 104. The image capturing apparatuses 101 capture images of objects 105 from multiple viewpoints that surround the objects 105. The image processing apparatus 102 performs an object shape estimation based on a volume intersection method by using pieces of image data of images captured by the image capturing apparatuses 101. Details will be described later. The display device 103 and the input devices 104 are connected to the image processing apparatus 102, and a processor (central processing unit (CPU), micro processing unit (MPU), or the like) reads out various programs stored in a read only memory (ROM) and performs various operations by using a temporary memory, such as a random access memory (RAM). A user operates the image processing apparatus 102 via the display device 103 and the input devices 104 to set image capturing conditions and check results obtained by processing pieces of image data acquired by capture of images.

Principle of Shape Estimation

Referring to FIGS. 2A and 2B, the principle of shape estimation based on the volume intersection method will be described. FIG. 2A illustrates the relationship between an arrangement of an object and an image capturing apparatus, and a silhouette of the object. Here, an example is given in which three image capturing apparatuses 201, 202, and 203 capture images of an object 207 to acquire pieces of silhouette data (hereinafter also referred to as silhouette image data) 204, 205, and 206. The object 207 here is a cylindrical object, and FIG. 2A illustrates the object 207 as viewed from above. FIG. 2B illustrates an estimated shape, and an estimated shape 211 is obtained by taking a common region in space among silhouettes (hereinafter also referred to as silhouette images) 208, 209, and 210 of the object 207. A method in which an object shape is estimated as a portion common to regions obtained by projecting silhouettes of an object into space in this way is the volume intersection method.

FIGS. 3A to 3C illustrate an overview of a shape estimation method in the present disclosure. Shape estimation in the present disclosure is based on the volume intersection method. In shape estimation in the present disclosure, for each pixel 303 on an output viewpoint 302, an interval over which a ray 304 passing through the pixel intersects an object 301 is calculated. In the present disclosure, a shape obtained by calculating such an intersection interval for all pixels on the output viewpoint 302 is defined as an estimated shape.

In the present disclosure, the ray 304 is projected onto pieces of silhouette data 305, 308, and 311 of respective viewpoints to calculate projected rays 307, 310, and 313, and intersections of the rays 307, 310, and 313 with object silhouettes 306, 309, and 312 are searched for to obtain intersection intervals.

FIG. 3B illustrates an outline of a flow of a shape estimation process. Here, an intersection interval over which a ray 315 intersects an object 314 is obtained. First, the ray 315 is projected onto first viewpoint silhouette data 316. A search is made along a projected ray 319 on the silhouette data, and intersection intervals 320 and 321 over which the ray 319 intersects object silhouettes 317 and 318 filled in with black are obtained. Here, assuming that a position of a pixel of interest on an output viewpoint is (u, v) and that an intrinsic parameter matrix and an extrinsic parameter matrix of the output viewpoint are respectively A and [R T], the ray 315 can be calculated according to Expression 1.

$$\begin{bmatrix} X \\ Y \\ Z \end{bmatrix} = kR^T A^{-1} \begin{bmatrix} u \\ v \\ 1 \end{bmatrix} - R^T T \quad (1)$$

In Expression 1, k is a value equivalent to a distance, and X, Y, and Z are three-dimensional coordinates at the time when a ray travels the distance k. An intersection interval is represented by a set of (k, k') where k is a distance at which the ray enters an object region and k' is a distance at which the ray leaves the object region. At the start of the process, the intersection interval (k, k') is set to be within a distance range where an object is present. Projection of the ray and the intersection interval onto m-th viewpoint silhouette data is performed according to Expression 2.

$$\lambda_m \begin{bmatrix} u_m \\ v_m \\ 1 \end{bmatrix} = A_m [R_m \ T_m] \begin{bmatrix} X \\ Y \\ Z \\ 1 \end{bmatrix} \quad (2)$$

In Expression 2, $A_m$ is an intrinsic parameter matrix of an m-th viewpoint, and $[R_m \ T_m]$ is an extrinsic parameter matrix of the m-th viewpoint. Furthermore, $(u_m, v_m)$ are coordinates projected onto the m-th viewpoint. On the basis of Expressions 1 and 2, coordinates $(u_m, v_m)$ of the ray on the silhouette data at the distance k and coordinates $(u'_m, v'_m)$ at the distance k' are calculated as a projected intersection interval. An intersection of a line segment formed by $(u_m, v_m)$ and $(u'_m, v'_m)$ with an object silhouette is searched for. A position at which a projected line segment 325 enters an object silhouette 326 may be a point 328 on a pixel boundary. Alternatively, the position may be a point 327 at which the line segment 325 enters the object silhouette 326 at a pixel center when scanning is performed for each pixel in a horizontal or vertical direction such that an inclination is small. In the present disclosure, the point 327 is used. Processing may be performed in which a silhouette is smoothed with reference to adjacent pixels. The same holds true for determining a position at which the line segment 325 leaves the object silhouette 326. In this way, a line segment serving as a portion common to the projected intersection interval and the object silhouette is obtained, and the projected intersection interval is updated. The inclination and line segment of the projected intersection interval may be calculated on the basis of the projected intersection interval $(u_m, v_m), (u'_m, v'_m)$, or may be calculated on the basis of an epipolar line.

Next, the projected intersection intervals are projected into space through three-dimensional reconstruction to calculate intersection intervals 322 and 323. That is, an updated intersection interval (k, k') is calculated. In this example, such processing is performed on each of the newly divided intersection intervals 322 and 323. Three-dimensional reconstruction of the coordinates $(u'_m, v'_m)$ on the m-th silhouette data is performed on the basis of Expression 3 or 4. Expression 3 is used for a search in a horizontal direction, and Expression 4 is used for a search in a vertical direction.

$$k = \frac{P_2 u - P_0}{Q_0 - Q_2 u} \quad (3)$$

$$k = \frac{P_2 v - P_1}{Q_1 - Q_2 v} \quad (4)$$

Here, P and Q are vectors like Expressions 5 and 6 obtained from Expressions 1 and 2.

$$P = A_m R_m R^T A^{-1} \begin{bmatrix} u \\ v \\ 1 \end{bmatrix} \quad (5)$$

$$Q = -A_m R_m R^T T + A_m T_m \quad (6)$$

Next, the calculated intersection intervals are projected onto second viewpoint silhouette data 324 again. Like the silhouette data 316, an intersection with an object silhouette is searched for and is three-dimensionally reconstructed, and then the same processing is repeated. In this way, art intersection interval is limited and determined by using pieces of silhouette data of respective viewpoints to estimate an object shape.

Figure 4:
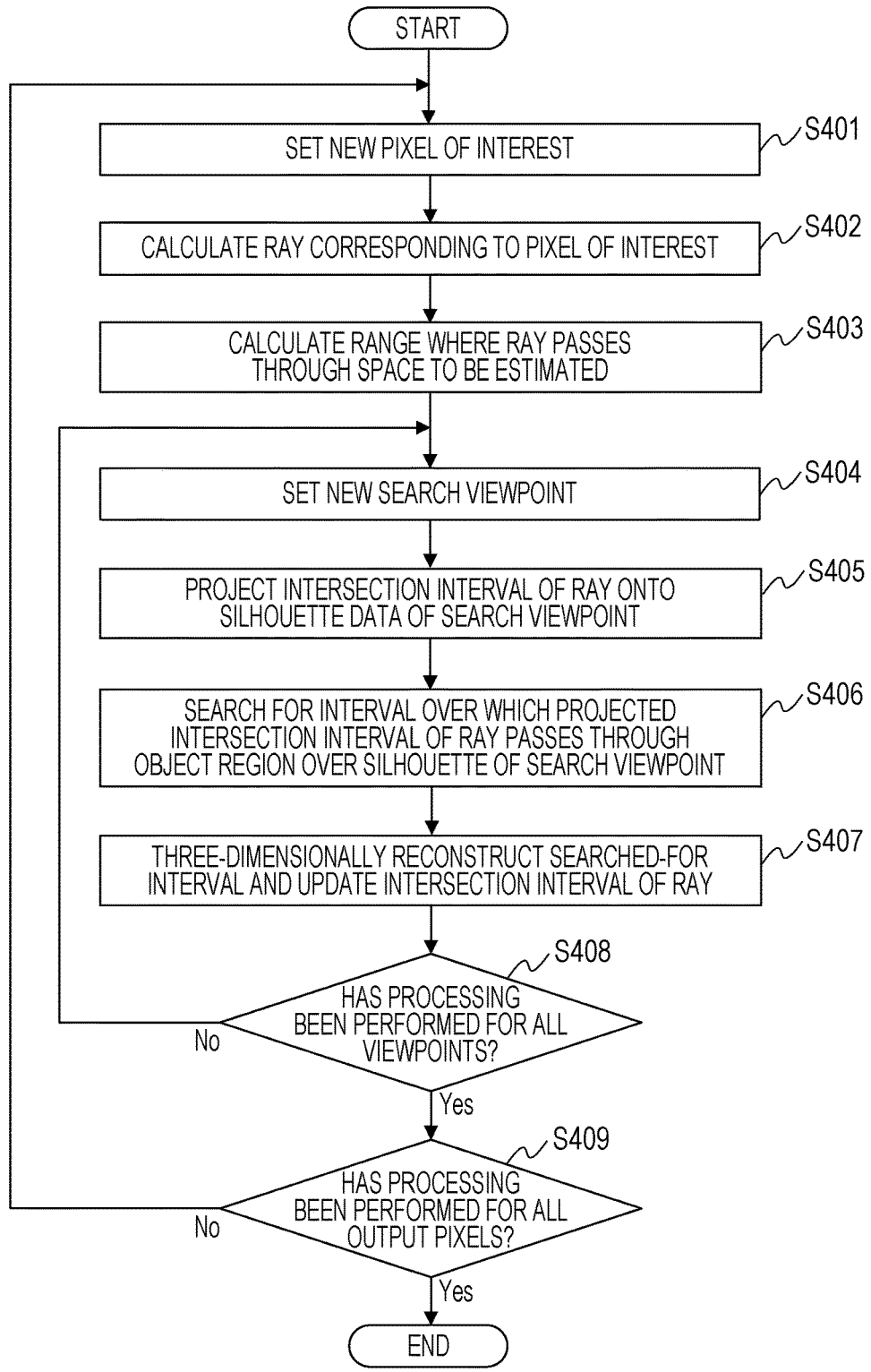
FIG. 4 illustrates a flow of the shape estimation method according to the present disclosure.

FIG. 4 illustrates a flow of the shape estimation process in the present disclosure. In step S401, a new pixel for which an intersection interval is calculated is set. In step S402, a ray corresponding to the pixel set in step S401 is calculated. In step S403, for the ray calculated in step S402, a range where the ray passes through space to be estimated is calculated as an intersection interval. In step S404, a new viewpoint for which an intersection with an object silhouette is searched for is set. In step S405, the intersection interval set in step S403 or step S407 is projected onto silhouette data of the search viewpoint set in step S404. In step S406, a range where a line segment obtained by projecting the intersection interval onto the silhouette data in step S405 passes over the object silhouette is searched for. In step S407, the range where the line segment passes over the object silhouette that has been searched for in step S406 is three-dimensionally reconstructed. The three-dimensionally reconstructed line segment in the space is updated as an intersection interval over which the ray intersects an object. In step S408, it is determined whether processing has been performed for all viewpoints. If the processing has not been performed for all viewpoints, the process flow returns to step S404, and the processing is repeated. If the processing has been performed for all viewpoints, the process flow proceeds to step S409. In step S409, it is determined whether processing has been performed for all output pixels. If the processing has not been performed for all output pixels, the process flow returns to step S401, and the processing is repeated. If the processing has been performed for all output pixels, the process ends.

Configuration of Image Processing Apparatus and Flow of Process

Figure 5:
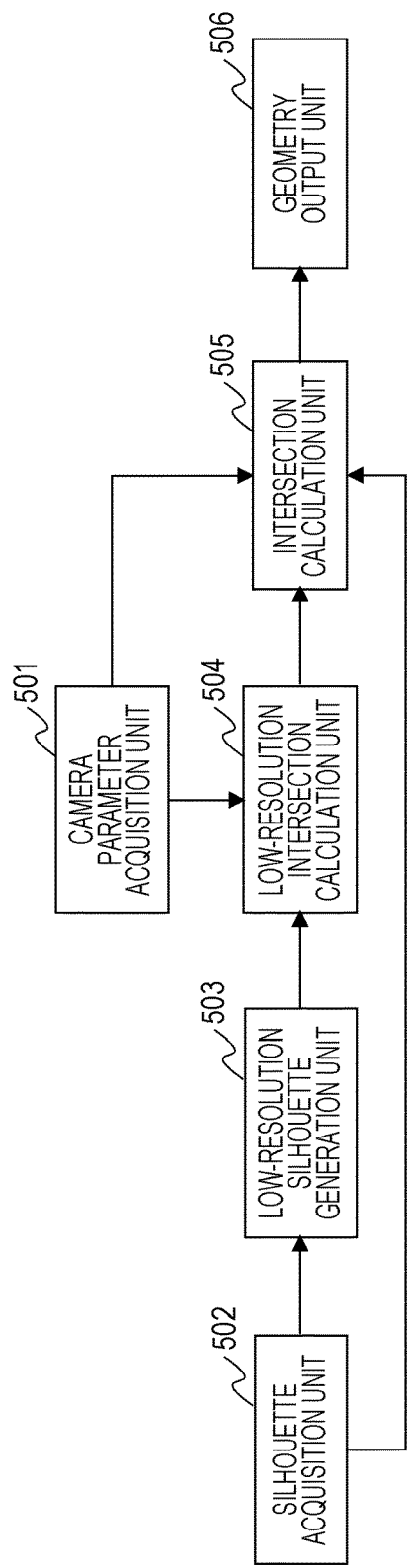
FIG. 5 is a block diagram illustrating an example of the configuration of an image processing apparatus according to the present disclosure.

FIG. 5 is a block diagram illustrating an example of the configuration of the image processing apparatus according to the first embodiment of the present disclosure.

A camera parameter acquisition unit 501 acquires camera parameters, such as extrinsic parameters representing positions and orientations and intrinsic parameters representing focal lengths and optical centers of the plurality of image capturing apparatuses 101. The camera parameters may be any form of information that enables calculation for projecting a three-dimensional point in space onto an image captured by each image capturing apparatus. The camera parameters are measurement values, design values, and the like that are stored on a memory in advance. The camera parameters may be acquired by communication between the image capturing apparatuses 101 and the image processing apparatus 102.

A silhouette acquisition unit 502 acquires pieces of silhouette data of an object in images captured by the plurality of image capturing apparatuses 101. Silhouette data is acquired by background subtraction using a background image captured in advance. To acquire silhouette data, any method may be used, and a method may be used in which a background is estimated from a moving image, for example. Silhouette data generated by another external device may be acquired.

A low-resolution silhouette generation unit 503 (hereinafter also referred to as a generation unit 503) performs low-resolution conversion from silhouette data acquired by the silhouette acquisition unit 502 to generate low-resolution data, which is silhouette data.

A low-resolution intersection calculation unit 504 calculates, on the basis of the camera parameters acquired by the camera parameter acquisition unit 501, intersection intervals over which rays corresponding to respective pixels on an output viewpoint (virtual viewpoint) intersect a low-resolution silhouette generated by the low-resolution silhouette generation unit 503.

An intersection calculation unit 505 calculates, on the basis of the camera parameters acquired by the camera parameter acquisition unit 501, an intersection of an intersection interval over which a ray intersects a low-resolution silhouette generated by the generation unit 503 with silhouette data acquired by the silhouette acquisition unit 502 to further limit and determine the intersection interval.

A geometry output unit 506 generates geometric data from an intersection interval calculated by the intersection calculation unit 505 and outputs it. The geometry output unit 506 here serves as a depth generation unit that extracts a start distance of an intersection interval in the foreground and generates geometric data as depth data.

Figure 6:
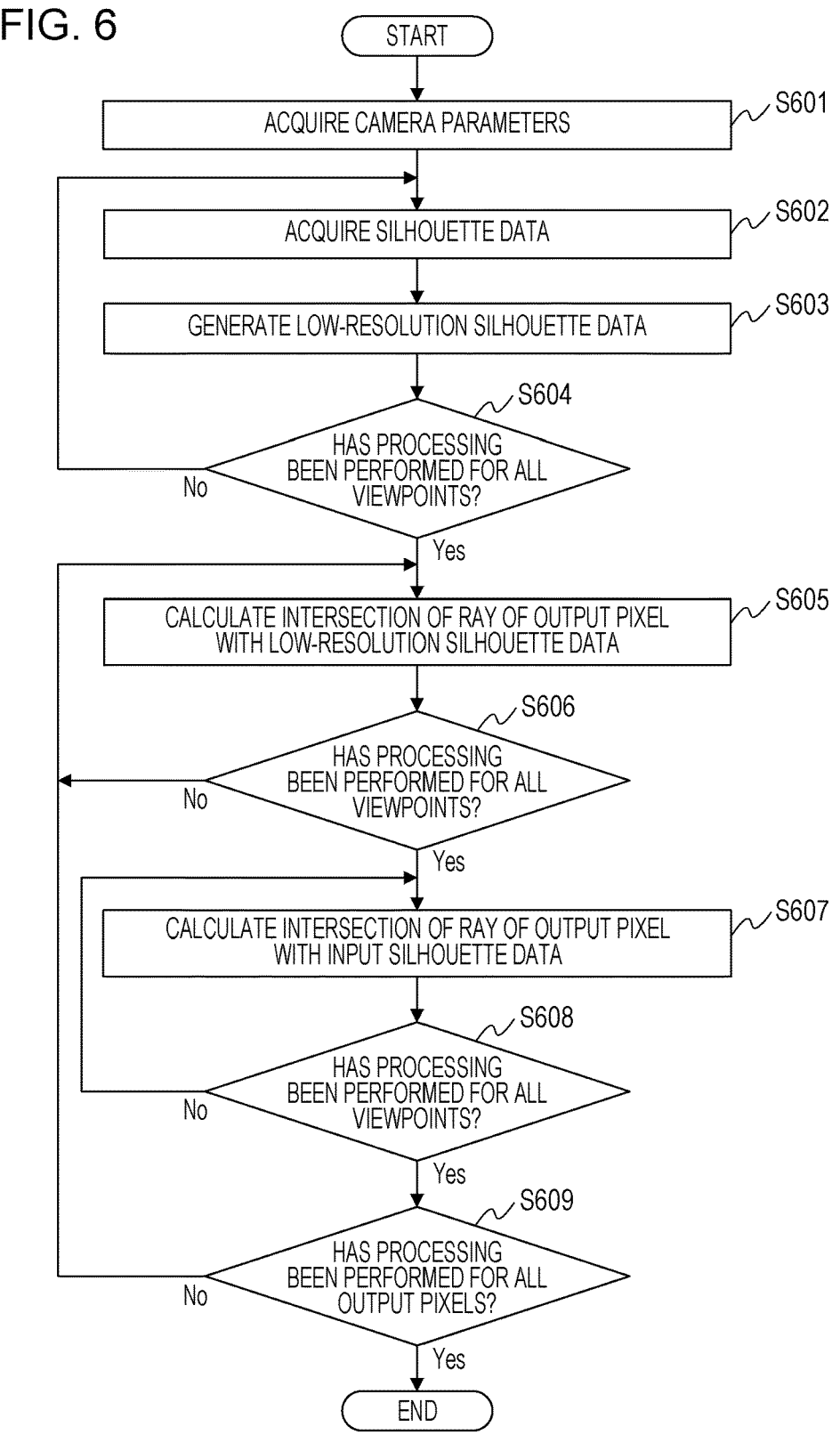
FIG. 6 illustrates a flow of a process performed by the image processing apparatus according to the present disclosure.

FIG. 6 illustrates an example of a flow of a process in the image processing apparatus to which the present disclosure can be applied.

In step S601, the camera parameter acquisition unit 501 acquires camera parameters.

In step S602, the silhouette acquisition unit 502 acquires silhouette data of an object of a new viewpoint.

Figure 7:
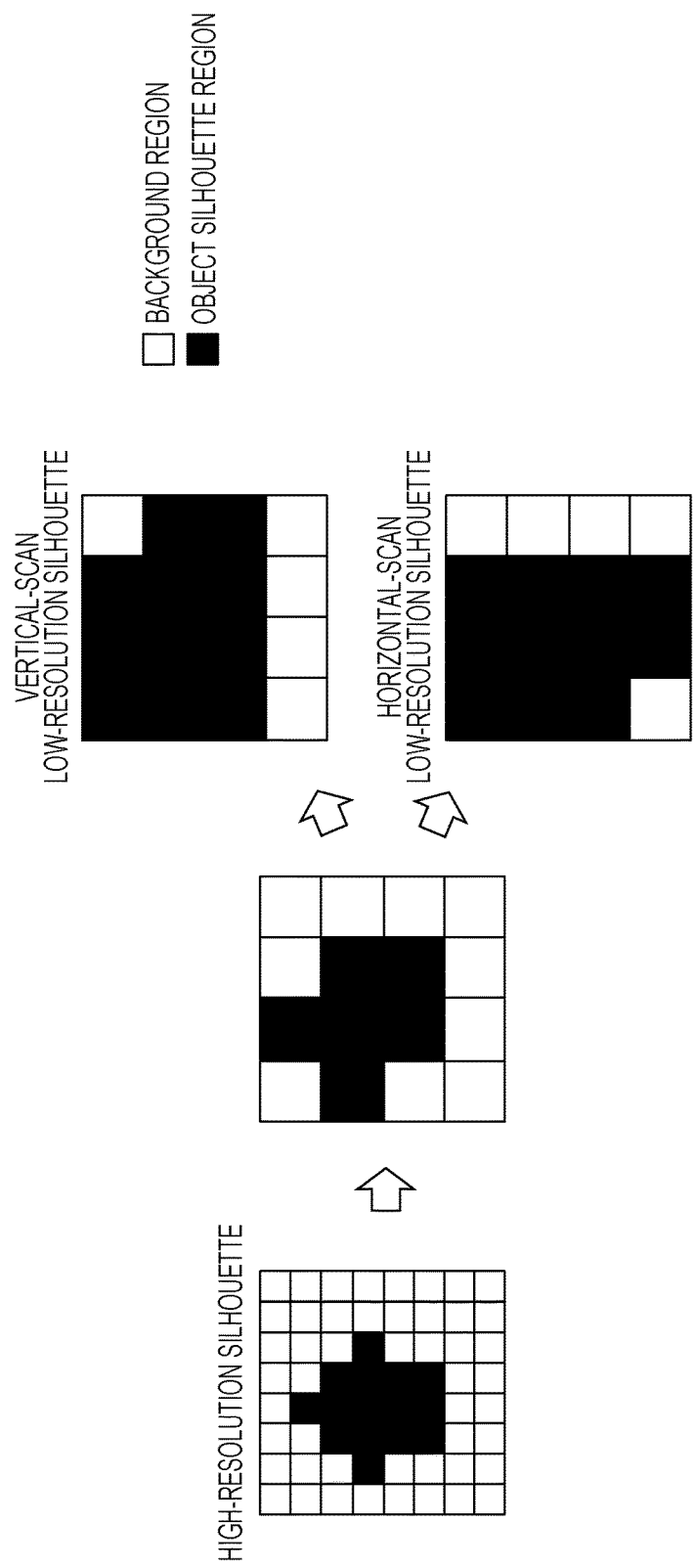
FIG. 7 illustrates an overview of the way that a low-resolution silhouette is generated in the present disclosure.

In step S603, the generation unit 503 generates low-resolution silhouette data from a silhouette acquired in step S602. FIG. 7 illustrates a method of calculating low-resolution silhouette data. In the present disclosure, low-resolution silhouette data whose one pixel corresponds to a plurality of pixels of acquired high-resolution silhouette data is generated. FIG. 7 illustrates an example of the way that low-resolution silhouette data is generated so that two pixels horizontally and two pixels vertically are combined into one pixel. Among pixels of the high-resolution silhouette data corresponding to a pixel of the low-resolution silhouette data, even it only one pixel is contained in an object silhouette, the pixel of the low-resolution silhouette data is also defined as an object silhouette. Assuming that an intersection of a projected ray with the object silhouette is defined by strict positions at which the ray enters and leaves pixels, like the point 328, the generated low-resolution silhouette data may be directly used. In the present disclosure, like the point 327, positions at which the ray enters and leaves the object silhouette that have been determined at a pixel center in a scan axis are used, and dilation processing is therefore performed on one pixel in a direction perpendicular to the scan axis so that an intersection interval of a high-resolution silhouette is contained in an intersection interval of a low-resolution silhouette with certainty. A low-resolution silhouette is switched between a vertical-scan low-resolution silhouette and a horizontal-scan low-resolution silhouette that are generated in this way, according to a scanning direction, and is used.

In step S604, it is determined whether processing has been performed for all viewpoints. If the processing has not been performed for all viewpoints, the process flow returns to step S602, and the processing is repeated. If the processing has been performed for all viewpoints, the process flow proceeds to step S605.

In step S605, the low-resolution intersection calculation unit 504 calculates, on the basis of the camera parameters acquired in step S601, an intersection of a ray corresponding to a new pixel of interest with a low-resolution silhouette of a new viewpoint generated in step S603. At this time, intrinsic parameters of the viewpoint of silhouette data are corrected by the amount by which the silhouette has been subjected to low-resolution conversion. Assuming that an intrinsic parameter matrix before correction is A, an intrinsic parameter matrix A' after the correction is represented as Expression 7.

$$A' = \begin{bmatrix} \frac{1}{b} & 0 & \frac{0.5}{b} - 0.5 \\ 0 & \frac{1}{b} & \frac{0.5}{b} - 0.5 \\ 0 & 0 & 1 \end{bmatrix} A \qquad (7)$$

In Expression 7, b is a block size at the time when low-resolution silhouette data is generated.

In step S606, it is determined whether processing has been performed for all the viewpoints. If the processing has not been performed for all the viewpoints, the process flow returns to step S605, and the processing is repeated. If the processing has been performed for all the viewpoints, the process flow proceeds to step S607.

In step S607, on the basis of the camera parameters acquired in step S601, the intersection calculation unit 505 limits and determines an intersection interval calculated in step S605 by using a silhouette of a new viewpoint acquired in step S602. In step S605, an intersection interval calculation using low-resolution silhouette data is performed with a small amount of calculation, thereby reducing intersection interval calculation processing using high-resolution silhouette data involving a large amount of calculation. Thus, in the present disclosure, a shape of an object can be calculated with a small amount of calculation.

In step S608, it is determined whether processing has been performed for all the viewpoints. If the processing has not been performed for all the viewpoints, the process flow returns to step S607, and the processing is repeated. If the processing has been performed for all the viewpoints, the process flow proceeds to step S609.

In step S609, it is determined whether processing has been performed for all pixels. If the processing has not been performed for all pixels, the process flow returns to step S605, and the processing is repeated. If the processing has been performed for all pixels, the process ends.

Although, in the present disclosure, one piece of low-resolution silhouette data is generated for each viewpoint, no low-resolution silhouette data has to be generated for a certain viewpoint. That is, for only a viewpoint for which low-resolution silhouette data has been calculated, the processes of steps S605 and S606 may be performed using its low-resolution silhouette data. Multiple pieces of low-resolution silhouette data may be generated for one viewpoint. That is, multiple pieces of low-resolution silhouette data with different resolutions may be generated, and the processes of steps S605 and S606 may be applied to the pieces of silhouette data in ascending order of resolution. Although, in the present disclosure, low-resolution silhouette data is generated from acquired silhouette data, low-resolution silhouette data calculated in advance may be acquired and used.

As described above, the present disclosure enables a shape of an object to be calculated with a small amount of calculation.

Second Embodiment

In the first embodiment, the example is given where, after an intersection interval is first calculated by using pieces of low-resolution silhouette data of all viewpoints, the intersection interval is limited and determined by using original silhouettes, and a shape estimation is thus performed with a small amount of calculation. In the second embodiment, an example is given where a low-resolution silhouette is used in searching for an intersection interval for each viewpoint, and a search is thus made with a small amount of calculation.

Figure 8:
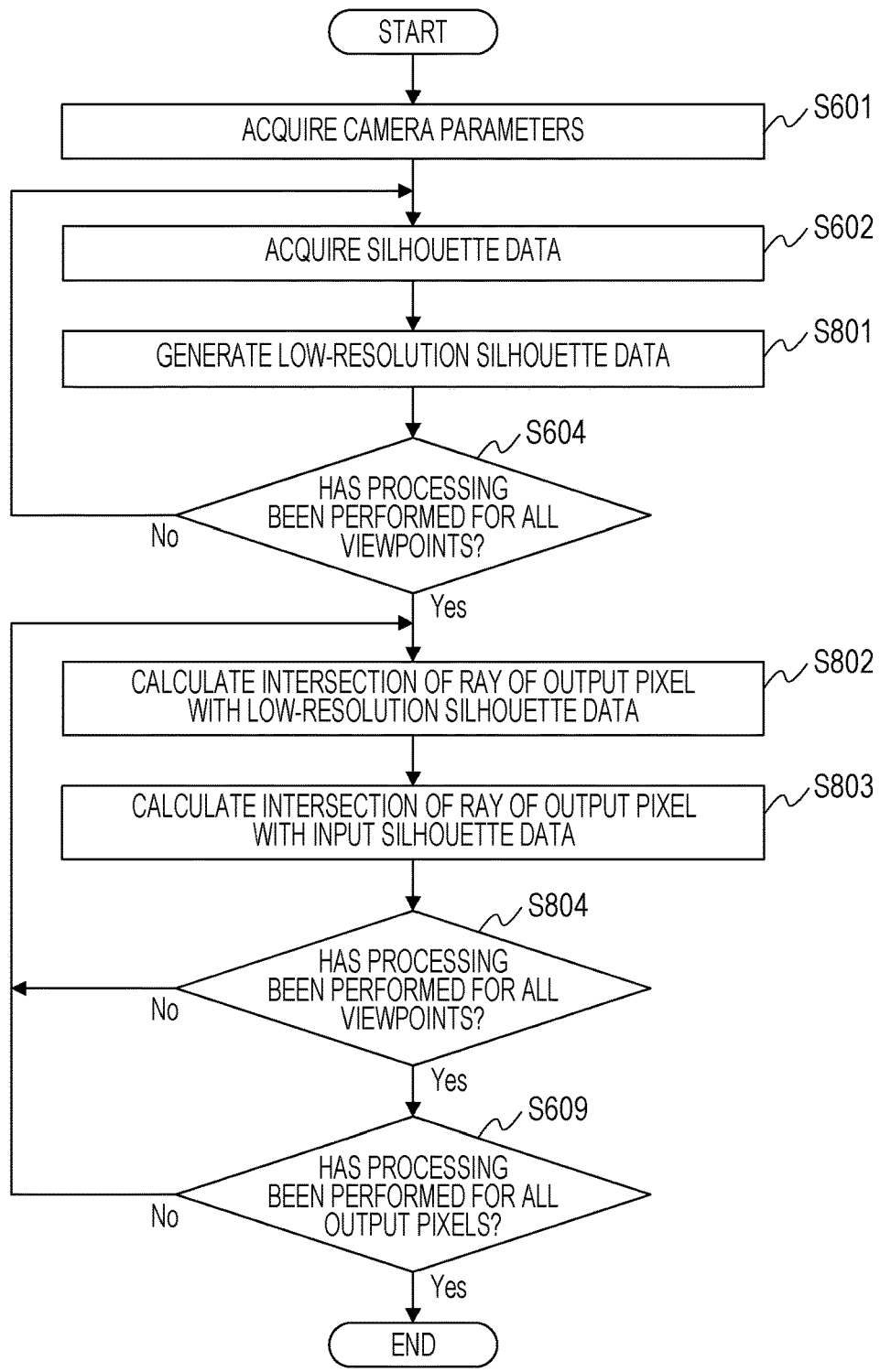
FIG. 8 illustrates a flow of a process performed by the image processing apparatus according to present disclosure.

FIG. 8 illustrates an example of a flow of a process in the image processing apparatus according to the second embodiment of the present disclosure. Processes of steps S801, S802, S803, and S804 differ from processes in the first embodiment. Here, changes made in components will be described.

Figure 9:
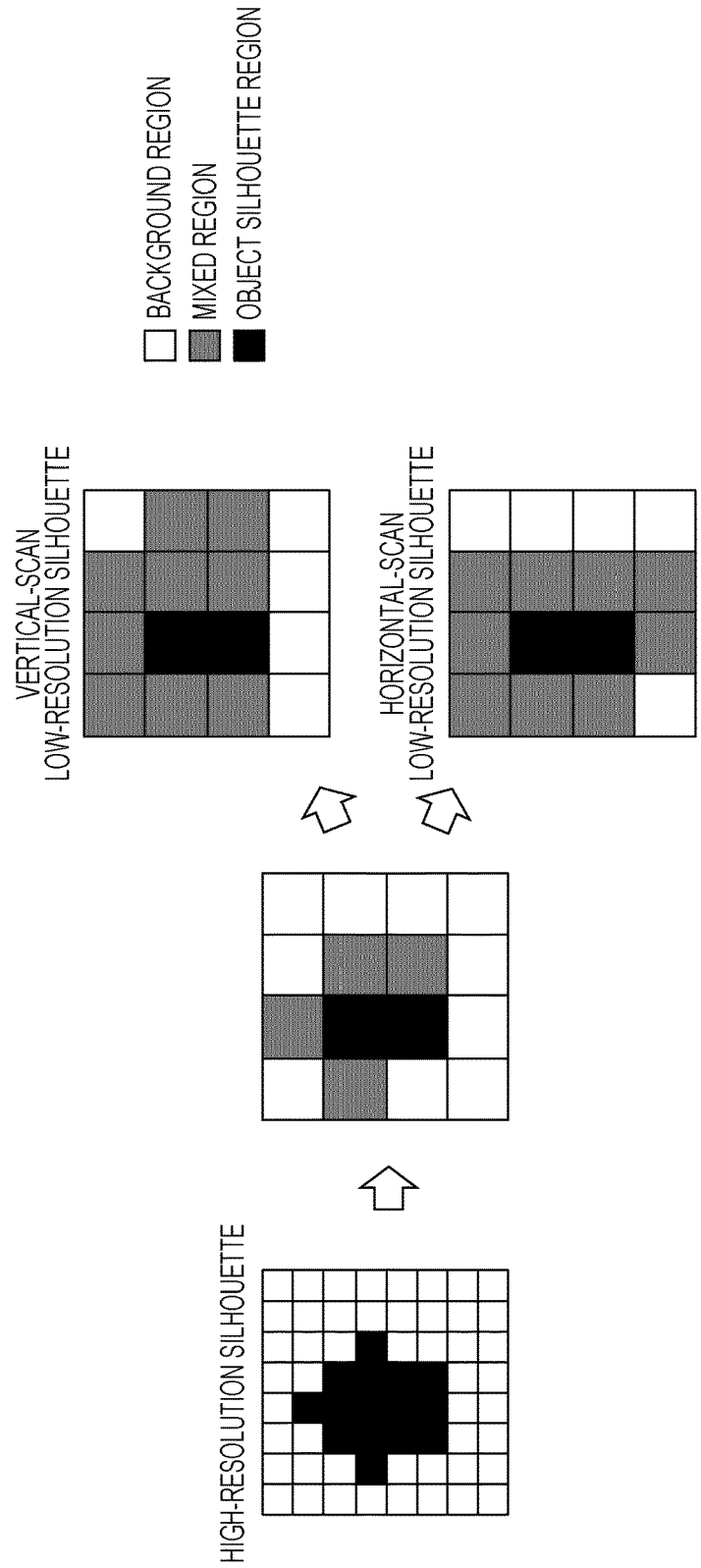
FIG. 9 illustrates an overview of the way that a low-resolution silhouette is generated in the present disclosure.

In step S801, the generation unit 503 generates low-resolution silhouette data from a silhouette acquired in step S602. FIG. 9 illustrates a method of calculating low-resolution silhouette data. In the second embodiment, unlike the first embodiment, among pixels of high-resolution silhouette data corresponding to a pixel of low-resolution silhouette data, if all the pixels are contained in an object silhouette, the pixel of the low-resolution silhouette data is defined as an object silhouette region. If all the pixels are contained in a non-object silhouette, the pixel of the low-resolution silhouette data is defined as a background region. If a pixel is contained in the object silhouette and the other pixels are contained in the non-object silhouette, the pixel of the low-resolution silhouette data is defined as a mixed region. As in the first embodiment, if positions at which a ray enters and leaves the object silhouette are determined at a pixel center in a pixel scan axis, dilation processing for a mixed region according to a scan axis is performed on pixels adjacent to the object silhouette region and the mixed region.

In step S802, the low-resolution intersection calculation unit 504 calculates, on the basis of camera parameters acquired in step S601, an intersection of a ray corresponding to a new pixel of interest with a low-resolution silhouette of a new viewpoint (viewpoint of interest) generated in step S801. With respect to a range where the ray passes through pixels contained in an object silhouette region or a background region in the low-resolution silhouette data, an intersection interval is determined in this step.

In step S803, on the basis of the camera parameters acquired in step S601, the intersection calculation unit 505 limits and determines the intersection interval calculated in step S802 by using a silhouette of the new viewpoint acquired in step S602. In this step, with respect to a range contained in a mixed region in the low-resolution silhouette data, an intersection interval is calculated. This can reduce a search using high-resolution silhouette data involving a large amount of calculation, thereby enabling an intersection interval to be calculated at low calculation cost in the present disclosure. Processing may be performed in which an intersection interval is limited and determined in steps S802 and S803 by using low-resolution silhouette data in the first embodiment having no mixed region.

In step S804, it is determined whether processing has been performed for all viewpoints. If the processing has not been performed for all viewpoints, the process flow returns to step S802, and the processing is repeated. If the processing has been performed for all viewpoints, the process flow proceeds to step S609.

Multiple pieces of low-resolution silhouette data may be generated for one viewpoint. That is, multiple pieces of low-resolution silhouette data with different resolutions may be generated, and the processes of steps S802 and S803 may be applied to the pieces of silhouette data in ascending order of resolution. Although, in the present disclosure, low-resolution silhouette data is generated from acquired silhouette data, low-resolution silhouette data calculated in advance may be acquired and used.

Figure 10B:
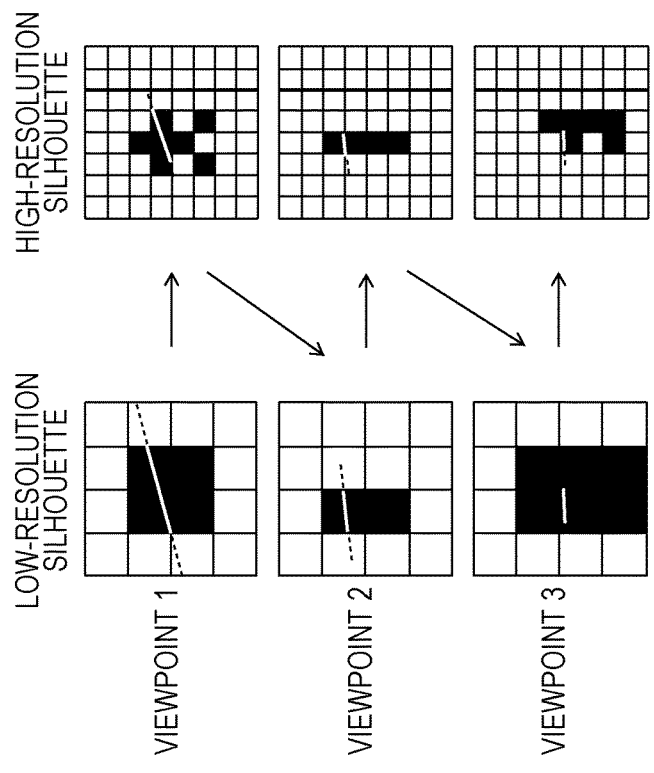
Figure 10A:
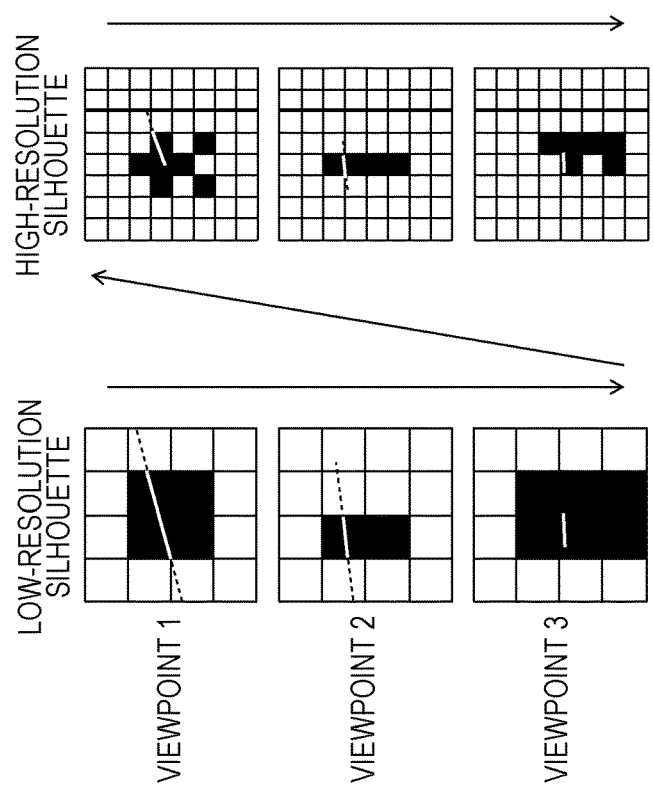

FIGS. 10A to 10C illustrates a comparison of overviews of the processes in the first embodiment and the second embodiment. In the first embodiment, as illustrated in FIG. 10A, after an intersection interval is calculated by using pieces of low-resolution silhouette data of all viewpoints, the intersection interval is limited and determined by using pieces of high-resolution silhouette data. On the other hand, in the second embodiment, as illustrated in FIG. 10B, for each viewpoint, the processing in which an intersection interval is limited and determined by using low-resolution silhouette data and the processing in which the intersection interval is limited and determined by using high-resolution silhouette data are sequentially performed. As illustrated in FIG. 10C, the first embodiment and the second embodiment may be combined. That is, after an intersection interval is calculated by using pieces of low-resolution silhouette data of all the viewpoints, for each viewpoint, the processing in which the intersection interval is limited and determined by using low-resolution silhouette data and the processing in which the intersection interval is limited and determined by using high-resolution silhouette data may be sequentially performed. At this time, two pieces of low-resolution silhouette data for each viewpoint may have different resolutions. Such a combination enables a further reduction in the amount of calculation.

As described above, the present disclosure enables a shape of an object to be calculated with a small amount of calculation.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computes executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-190475 filed Sep. 29, 2016, which is hereby incorporated by reference herein in its entirety.

What is claimed is:

1. An image processing apparatus comprising:
an acquisition unit configured to acquire pieces of silhouette image data of an object viewed from multiple different viewpoints;
a generation unit configured to generate, from the pieces of silhouette image data, pieces of low-resolution data representing images with a resolution lower than the pieces of silhouette image data; and
an estimation unit configured to, by performing, for a plurality of line segments in space containing the object, processing in which, after a line segment in the space is projected onto a piece of low-resolution data to calculate a first intersection of the line segment with the object, the line segment is projected onto a piece of silhouette image data to calculate a second intersection of the line segment with the object, calculate intervals over which the plurality of line segments intersect the object and estimate a shape of the object.

2. The image processing apparatus according to claim 1, wherein, after applying the first intersection to pieces of low-resolution data of the multiple different viewpoints, the estimation unit applies the second intersection to pieces of silhouette image data of the multiple different viewpoints.

3. The image processing apparatus according to claim 1, wherein the generation unit generates first low-resolution data so that, if a region of the object is contained in a pixel of a piece of silhouette image data corresponding to a pixel of a piece of low-resolution data, the pixel of the piece of low-resolution data is defined as the region, and performs dilation processing on the first low-resolution data to generate the piece of low-resolution data.

4. The image processing apparatus according to claim 1, wherein, after obtaining the first intersection from low-resolution data of a viewpoint of interest selected from the multiple different viewpoints, the estimation unit obtains the second intersection from silhouette image data of the viewpoint of interest.

5. The image processing apparatus according to claim 4, wherein the generation unit generates first low-resolution data
so that, if all pixels of a piece of silhouette image data corresponding to a pixel of a piece of low-resolution data are a region of the object, the pixel of the piece of low-resolution data is defined as the region,
so that, if all pixels of a piece of silhouette image data corresponding to a pixel of a piece of low-resolution data are a region of a background, the pixel of the piece of low-resolution data is defined as a background region, and
so that, if the region of the object and the background region are contained in pixels of a piece of silhouette image data corresponding to a pixel of a piece of low-resolution data, the pixel of the piece of low-resolution data is defined as a mixed region, and
performs dilation processing on the first low-resolution data to generate the piece of low-resolution data.

6. The image processing apparatus according to claim 1, wherein the estimation unit includes a three-dimensional reconstruction unit configured to three-dimensionally reconstruct an intersection on the piece of silhouette image data in the space.

7. The image processing apparatus according to claim 1, further comprising:
a depth generation unit configured to generate depth data for a virtual viewpoint,
wherein a line segment in the space is a pixel of depth data of the virtual viewpoint, and
wherein the depth generation unit generates depth data based on the intervals.

8. The image processing apparatus according to claim 1, further comprising:
a plurality of image capturing units configured to capture images of an object from multiple viewpoints; and an extraction unit configured to extract the pieces of silhouette image data from multiple pieces of image data obtained by the image capturing units capturing images, wherein the acquisition unit acquires the pieces of silhouette image data extracted by the extraction unit.

9. An image processing method comprising:

an acquisition step of acquiring pieces of silhouette image data of an object viewed from multiple different viewpoints;

a generation step of generating, from the pieces of silhouette image data, pieces of low-resolution data representing images with a resolution lower than the pieces of silhouette image data; and an estimation step of, by performing, for a plurality of line segments in space containing the object, processing in which, after a line segment in the space is projected onto a piece of low-resolution data to calculate a first intersection of the line segment with the object, the line segment is projected onto a piece of silhouette image data to calculate a second intersection of the line segment with the object, calculating intervals over which the plurality of line segments intersect the object and estimating a shape of the object.

10. A non-transitory storage medium storing a program including instructions, which when executed by a computer, cause the computer to perform an image processing method comprising:

an acquisition step of acquiring pieces of silhouette image data of an object viewed from multiple different viewpoints;

a generation step of generating, from the pieces of silhouette image data, pieces of low-resolution data representing images with a resolution lower than the pieces of silhouette image data; and an estimation step of, by performing, for a plurality of line segments in space containing the object, processing in which, after a line segment in the space is projected onto a piece of low-resolution data to calculate a first intersection of the line segment with the object, the line segment is projected onto a piece of silhouette image data to calculate a second intersection of the line segment with the object, calculating intervals over which the plurality of line segments intersect the object and estimating a shape of the object.

* * * * *